United States Patent
Sarkar et al.

(10) Patent No.: US 10,042,629 B2
(45) Date of Patent: Aug. 7, 2018

(54) REMOTE VEHICLE UPDATE INSTALLATION SCHEDULING

(71) Applicant: GM GLOBAL TECHNOLOGY OPERATIONS LLC, Detroit, MI (US)

(72) Inventors: Susanta P. Sarkar, Rochester Hills, MI (US); James D. Forsmark, Saint Clair Shores, MI (US); Alan D. Wist, Macomb, MI (US); Peter M. Ansbro, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/299,932

(22) Filed: Oct. 21, 2016

(65) Prior Publication Data

US 2018/0032324 A1    Feb. 1, 2018

Related U.S. Application Data

(60) Provisional application No. 62/367,920, filed on Jul. 28, 2016.

(51) Int. Cl.
   *G06F 8/65*   (2018.01)
   *G06F 9/44*   (2018.01)

(52) U.S. Cl.
   CPC . *G06F 8/65* (2013.01); *G06F 8/68* (2013.01)

(58) Field of Classification Search
   None
   See application file for complete search history.

(56) References Cited

U.S. PATENT DOCUMENTS

| 8,813,061 | B2 * | 8/2014 | Hoffman | G06F 8/65 |
| | | | | 717/168 |
| 8,949,823 | B2 * | 2/2015 | Ricci | G06F 13/14 |
| | | | | 717/168 |
| 9,720,680 | B2 * | 8/2017 | Diedrich | G06F 8/65 |
| 9,747,096 | B2 * | 8/2017 | Searle | H04L 41/082 |
| 2013/0096737 | A1 * | 4/2013 | Suganuma | G06F 8/65 |
| | | | | 701/2 |
| 2015/0113521 | A1 * | 4/2015 | Suzuki | G06F 8/65 |
| | | | | 717/173 |
| 2015/0277891 | A1 * | 10/2015 | Choi | G06F 8/65 |
| | | | | 717/170 |

(Continued)

OTHER PUBLICATIONS

Mahmud et al. "Secure software upload in an intelligent vehicle via wireless communication links." Intelligent Vehicles Symposium, 2005. Proceedings. IEEE. IEEE, 2005.Retrieved on [Jan. 4, 2018] Retrieved from the Internet: URL<http://ieeexplore.ieee.org/abstract/document/1505167/>.*

(Continued)

*Primary Examiner* — Thuy Dao
*Assistant Examiner* — Cheneca Smith
(74) *Attorney, Agent, or Firm* — Cantor Colburn LLP (57) ABSTRACT

Technical solutions are described for updating a plurality of electronically controlled units (ECU) in a vehicle with multiple communication buses. An example method includes determining an installation order for updating the plurality of ECU based on a priority level assigned to each of the ECU, and a size of each update package for each of the ECU. The method also includes updating the ECU concurrently by installing the respective update packages according to the installation order.

14 Claims, 5 Drawing Sheets

(56) References Cited

U.S. PATENT DOCUMENTS

| | | | |
|---|---|---|---|
| 2016/0086391 A1* | 3/2016 | Ricci | G07C 5/008 |
| | | | 701/29.3 |
| 2016/0117162 A1* | 4/2016 | Searle | H04L 41/082 |
| | | | 717/173 |
| 2017/0024201 A1* | 1/2017 | Diedrich | G06F 8/65 |
| 2017/0046149 A1* | 2/2017 | Quin | G06F 8/65 |

OTHER PUBLICATIONS

Nilsson et al. "Secure firmware updates over the air in intelligent vehicles." Communications Workshops, 2008. ICC Workshops' 08. IEEE International Conference on. IEEE, 2008. Retrieved on [Jan. 4, 2018] Retrieved from the Internet: URL<http://ieeexplore.ieee.org/abstract/document/4531926/>.*

* cited by examiner

REMOTE VEHICLE UPDATE INSTALLATION SCHEDULING

CROSS-REFERENCE TO RELATED APPLICATIONS

This application claims priority to U.S. Provisional Patent Application Ser. No. 62/367,920, filed Jul. 28, 2016, and all the benefits accruing therefrom under 35 U.S.C. § 119, and the contents of 62/367,920 in its entirety are herein incorporated by reference.

TECHNICAL FIELD

The present disclosure relates to vehicles, and more particularly to methods and systems for updating one or more electronically controlled units (ECUs) of the vehicle remotely in an efficient and flexible manner.

INTRODUCTION

Vehicle systems, such as powertrain systems, body control systems, antilock braking systems, and the like, are increasingly controlled by one or more electronically controlled units (ECUs). Each ECU includes software for its particular vehicle system, such as operating control software and calibration files including gains and setpoints. The ECUs are responsive to driver demands and vehicle conditions to control the vehicle system operations. From time to time, the software is updated to reflect software improvements and corrections by reflashing software stored in flash memory and installing new software versions. Software is also updated to suit user preferences.

SUMMARY

According to one or more exemplary embodiments, a computer-implemented method for updating a plurality of electronically controlled units (ECU) in a vehicle with multiple communication buses, includes determining an installation order for updating the plurality of ECU based on a priority level assigned to each of the ECU, and a size of each update package for each of the ECU. The computer-implemented method also includes updating the ECU concurrently by installing the respective update packages according to the installation order.

According to one or more exemplary embodiments, an apparatus for updating a plurality of electronically controlled units (ECU) in a vehicle includes a memory, a communication interface configured to communicate with the ECUs of the vehicle, and a processor coupled with the memory and the communication interface. The processor accesses an installation package that includes a plurality of update packages corresponding to the plurality of ECUs respectively. The processor also determines an installation order for updating the plurality of ECUs based on a priority level assigned to each of the ECUs, and a size of each update package. The processor further updates the ECUs by installing a subset of the update packages concurrently according to the installation order.

According to one or more exemplary embodiments, a computer-program product for updating a plurality of electronically controlled units (ECU) in a vehicle includes a computer readable storage medium that includes computer executable instructions. The computer readable storage medium includes instructions to access an installation package that includes a plurality of update packages corresponding to the plurality of ECUs respectively. The computer readable storage medium includes instructions to determine an installation order for updating the plurality of ECUs based on a priority level assigned to each of the ECUs, and a size of each update package. The computer readable storage medium includes instructions to update the ECUs by installing a subset of the update packages concurrently according to the installation order.

The above features and advantages, and other features and advantages, of the technical solutions are readily apparent from the following detailed description of the technical solutions when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

The following description is merely exemplary in nature and is not intended to limit the present disclosure, its application, or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein facilitate remotely updating electronically controlled units (ECUs) in a vehicle in an efficient and flexible manner. Updating an ECU may include updating software that controls the ECU.

Updating one or more ECUs presents several obstacles. For example, the update depends on the owner bringing the vehicle to the dealer for the software update. The owner may not receive the notice of the update. The owner may skip a useful update due to the inconvenience in time and effort involved in taking the vehicle to the dealer.

Further, when updating any ECU, the update processes has to ascertain that the updated software version for the ECU is correct and compatible with the software versions present in other ECUs in the vehicle. For example, consider a vehicle that has a first ECU and a second ECU. If the first ECU is to be updated to a software version ECU1-1.1.2, the second ECU may be made compatible with software version ECU2-3.2.1 installed for the first ECU to operate properly. If the second ECU is using an older software version, such as ECU2-3.1.8, the second ECU also is to be updated before or at the same time that the first ECU is updated to software version ECU1-1.1.2.

Accordingly, the technical solutions described herein update the ECUs by remote reflashing of software, for example through a wireless communication network, like a mobile vehicle communication system, WIFI™, and so on, and overcome the above obstacles. The technical solutions also operate when the ECUs are updated in a wired manner, such as at a dealer/mechanic, where the vehicle may be connected to an updating device, such as a computer that contains an update package. Further, the technical solutions facilitate updating multiple ECUs in the vehicle in a single update session, thus reducing the time of installation. The technical solutions take into consideration the timing dependencies among the multiple ECUs during the software update installation. To this end, the technical solutions facilitate parallel installation of the updates, with serial capabilities in view of restraints, such as timing dependencies.

Figure 1:
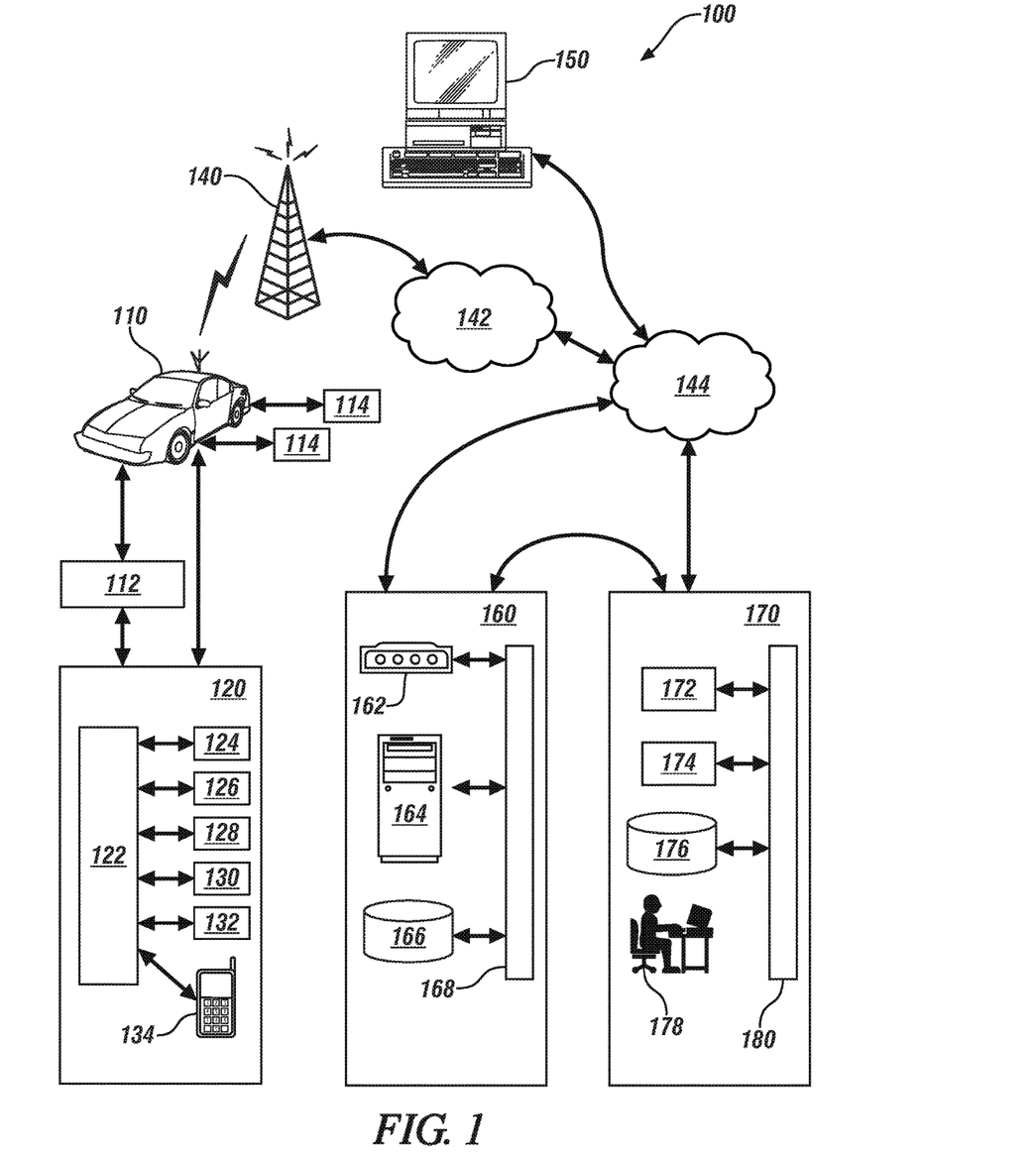
FIG. 1 is an illustrative operating environment for remote update of ECUs through a wireless network, such as a mobile vehicle communication system.

FIG. 1 is an illustrative operating environment for remote update of ECUs through a wireless network, such as a mobile vehicle communication system. FIG. 1 shows a mobile vehicle communication system 100. Mobile communication system 100 includes at least one mobile vehicle 110 (vehicle) including vehicle communication network 112 and telematics device 120; one or more wireless carrier systems 140; one or more communication networks 142; one or more land networks 144; one or more client, personal or user computers 150; one or more web-hosting portals 160; and one or more call centers 170. The mobile vehicle 110 includes a plurality of electronically controlled units (ECUs) 114 in communication with the telematics device 120. In one embodiment, mobile vehicle 110 is implemented as a vehicle equipped with suitable hardware and software for transmitting and receiving voice and data communications. The telematics device 120 is also called a vehicle communications unit (VCU) or a telematics unit.

In one embodiment, the telematics device 120 includes a processor 122 connected to a wireless modem 124, a global positioning system (GPS) unit 126, an in-vehicle memory 128 such as, for example, a non-volatile flash memory, a microphone 130, one or more speakers 132, and an embedded or in-vehicle mobile phone 134. In one embodiment, processor 122 is a microcontroller, controller, host processor, or vehicle communications processor. In an example, processor 122 is implemented as an application specific integrated circuit (ASIC). GPS unit 126 provides longitude and latitude coordinates of the vehicle, as well as a time and date stamp. In-vehicle mobile telephone system 134 is a cellular-type phone such as, for example, an analog, digital, dual-mode, dual-band, multi-mode, or multi-band cellular phone. In another example, the mobile telephone system is an analog mobile telephone system operating over a prescribed band nominally at 800 MHz. In another example, the mobile telephone system is a digital mobile telephone system operating over a prescribed band nominally at 800 MHz, 900 MHz, 1900 MHz, or any suitable band capable of carrying digital cellular communications.

Processor 122 executes various computer programs and communication control and protocol algorithms that affect communication, programming, and operational modes of electronic and mechanical systems within vehicle 110. In one embodiment, processor 122 is an embedded system controller. In another embodiment, processor 122 controls communications between telematics device 120, wireless carrier system 140, and call center 170. In yet another embodiment, processor 122 controls communications between the wireless modem 124 and nodes of a mobile ad hoc network. In still another embodiment, processor 122 provides processing, analysis, and control functions for determining engine emission performance for vehicle 110. Processor 122 is configured to generate and receive digital signals transmitted between telematics device 120 and a vehicle communication network 112 that is connected to various electronic modules in the vehicle 110. In one embodiment, the digital signals activate a programming mode and operation modes, as well as provide for data transfers. In another embodiment, a utility program facilitates the transfer of emission data, emission analysis data, instructions, triggers, and data requests between vehicle 110 and a call center 170.

Mobile vehicle 110, via a vehicle communication network 112, sends signals to various units of equipment and systems within vehicle 110 to perform various functions such as monitoring the operational state of vehicle systems, collecting and storing data from the vehicle systems, providing instructions, data and programs to various vehicle systems, and calling from telematics device 120. In facilitating interactions among the various communication and electronic modules, vehicle communication network 112 utilizes interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Vehicle 110, via telematics device 120, sends and receives radio transmissions from wireless carrier system 140. Wireless carrier system 140 is implemented as any suitable system for transmitting a signal from mobile vehicle 110 to communication network 142. Wireless carrier system 140 incorporates any type of telecommunications in which electromagnetic waves carry signal over part of or the entire communication path. In one embodiment, wireless carrier system 140 transmits analog audio and/or video signals. In an example, wireless carrier system 140 transmits analog audio and/or video signals such as those sent from AM and FM radio stations and transmitters, or digital audio signals in the S band (approved for use in the U.S.) and L band (used in Europe and Canada). In one embodiment, wireless carrier system 140 is a satellite broadcast system broadcasting over a spectrum in the S band (2.3 GHz) that has been allocated by the U.S. Federal Communications Commission (FCC) for nationwide broadcasting of satellite-based Digital Audio Radio Service (DARS).

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144. In one example, wireless carrier system 140 includes a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another example, the carrier system 140 uses services in accordance with other standards such as, for example, IEEE 802.11 compliant wireless systems and Bluetooth compliant wireless systems.

Land network 144 is a public-switched telephone network (PSTN). In one embodiment, land network 144 is implemented as an Internet protocol (IP) network. in other embodiments, land network 144 is implemented as a wired network, an optical network, a fiber network, another wireless network, a virtual private network (VPN), or any combination thereof. Land network 144 is connected to one or more landline telephones. Land network 144 connects communication network 142 to computer 150, web-hosting portal 160, and call center 170. Communication network 142 and land network 144 connect wireless carrier system 140 to web-hosting portal 160 and call center 170.

Client, personal, or user computer 150 includes a computer usable medium to execute Internet-browser and Internet-access computer programs for sending and receiving data over land network 144 and, optionally, wired or wireless communication networks 142 to web-hosting portal 160 and vehicle 110. Computer 150 sends data to web-hosting portal through a web-page interface using communication standards such as hypertext transport protocol (HTTP) and transport-control protocol Internet protocol (TCP/IP). In one embodiment, the data includes directives to change certain programming and operational modes of electronic and mechanical systems within vehicle 110. In another embodiment, the data includes requests for certain data such as vehicle system performance information. In operation, a user, such as, for example, a vehicle designer or manufacturing engineer, utilizes computer 150 to exchange information with mobile vehicle 110 that is cached or stored in web-hosting portal 160. In an embodiment, vehicle system performance information from client-side software is transmitted to server-side software of web-hosting portal 160. In one embodiment, vehicle system performance information is stored at web-hosting portal 160. In another embodiment, computer 150 includes a database (not shown) for storing received vehicle system performance data. In yet another embodiment, a private Local Area Network (LAN) is implemented for client computer 150 and web-hosting portal 160, such that web-hosting portal is operated as a Virtual Private Network (VPN).

Web-hosting portal 160 includes one or more data modems 162, one or more web servers 164, one or more databases 166, and a network 168. Web-hosting portal 160 is connected directly by wire to call center 170, or connected by phone lines to land network 144, which is connected to call center 170. Web-hosting portal 160 is connected to land network 144 by one or more data modems 162. Land network 144 transmits digital data to and from modem 162; data that is subsequently transferred to web server 164. In one implementation, modem 162 resides inside web server 164. Land network 144 transmits data communications between web-hosting portal 160 and call center 170.

Web server 164 receives various data, requests, or instructions from computer 150 via land network 144. In alternative embodiments, computer 150 includes a wireless modem to send data to web-hosting portal 160 through a wireless communication network 142 and a land network 144. Data is received by modem 162 and sent to one or more web servers 164. In one embodiment, web server 164 is implemented as any suitable hardware and software capable of providing web services to transmit and receive data from computer 150 to telematics device 120 in vehicle 110. Web server 164 sends to or receives data transmissions from one or more databases 166 via network 168. In an embodiment, web server 164 includes computer applications and files for managing emission performance data.

In one embodiment, one or more web servers 164 are networked via network 168 to distribute vehicle engine emission performance data among its network components such as database 166. In an example, database 166 is a part of or a separate computer from web server 164. In one embodiment, web-server 164 sends data transmissions including vehicle system performance information to call center 170 via modem 162, and through land network 144.

Call center 170 is a location where calls are received and serviced at the same time, or where calls are sent at the same time. In one embodiment, the call center is a telematics call center, facilitating communications to and from telematics device 120 in vehicle 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more networks 180.

Switch 172 of call center 170 connects to land network 144. Switch 172 transmits voice or data transmissions from call center 170, and receives voice or data transmissions from telematics device 120 in mobile vehicle 110 through wireless carrier system 140 and/or wireless modem 124, communication network 142, and land network 144. Switch 172 receives data transmissions from, and sends data transmissions to, one or more web-hosting portals 160. Switch 172 receives data transmissions from, or sends data transmissions to, one or more communication services managers 174 via one or more networks 180.

Communication services manager 174 is a combination of hardware and software capable of providing communication services to telematics device 120 in mobile vehicle 110. Communication services manager 174 sends data transmissions to, or receives data transmissions from one or more communication services databases 176 via network 180. Communication services manager 174 sends data transmission to or receives data transmissions from one or more communication services advisors 178 via network 180. Communication services database 176 sends data transmission to or receives data transmissions from communication services advisor 178 via network 180. Communication services advisor 178 receives voice or data transmission from or sends voice or data transmissions to switch 172.

Communication services manager 174 facilitates one or more services, such as, but not limited to, enrollment services, navigation assistance, directory assistance, roadside assistance, business or residential assistance, information services assistance, emergency assistance, communications assistance, and telematics retrieval of vehicle system performance information. Communication services manager 174 transmits and receives operational status, instructions, and other types of vehicle data to telematics device 120 in mobile vehicle 110 through wireless carrier system 140, communication network 142, land network 144, wireless modem 124, voice and data switch 172, and network 180. Communication services manager 174 stores or retrieves vehicle system performance information from communication services database 176. Communication services manager 174 provides requested information to communication services advisor 178.

In one embodiment, communication services advisor 178 is a virtual advisor. In an example, communication services advisor 178 is a human being at a service provider service center in verbal communication with a service subscriber in mobile vehicle 110 via telematics device 120. In another example, a virtual advisor is implemented as a synthesized voice interface responding to requests from telematics device 120 in mobile vehicle 110.

Communication services advisor 178 provides services to telematics device 120 in mobile vehicle 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics device 120 in mobile vehicle 110 through wireless carrier system 140, communication network 142, and land network 144 using voice transmissions, or through communication services manager 174 and switch 172 using data transmissions. Switch 172 selects between voice transmissions and data transmissions.

Mobile vehicle 110 initiates service requests to call center 170 by sending a voice or digital-signal command to telematics device 120, which, in turn, sends an instructional signal or a voice call through wireless modem 124, wireless carrier system 140, communication network 142, and land network 144 to call center 170. In one embodiment, one or more triggers stored in the telematics device 120 cause the vehicle to initiate a service request. The trigger is, for example, a number of ignition cycles, a specific time and date, an expired time, a number of kilometers, an absolute Global Positioning System (GPS) timestamp, a request for vehicle emission performance data and the like.

Mobile vehicle 110 includes a plurality of electronically controlled units (ECUs) 114. The ECUs 114 are responsive to driver demands and vehicle conditions to control vehicle system operations. Examples of vehicle systems including ECUs 114 are power train systems, body control systems, antilock braking systems, and the like. Each ECU 114 stores software for its particular vehicle system. Typically, the ECUs 114 include a processor for executing software and storage for storing software and data. In one embodiment, the storage includes flash memory that can be erased and rewritten to store new software and data. The software includes operating control software and calibration files, which include gain and setpoint values. The ECUs 114 are in communication with the telematics device 120 to send and receive information such as software, data, and status flags over the wireless carrier systems 140. In one or more examples, the telematics device 120 in response to receiving an instruction to update the ECUs 114, receives the updates via the mobile vehicle communication system 100.

Figure 2:
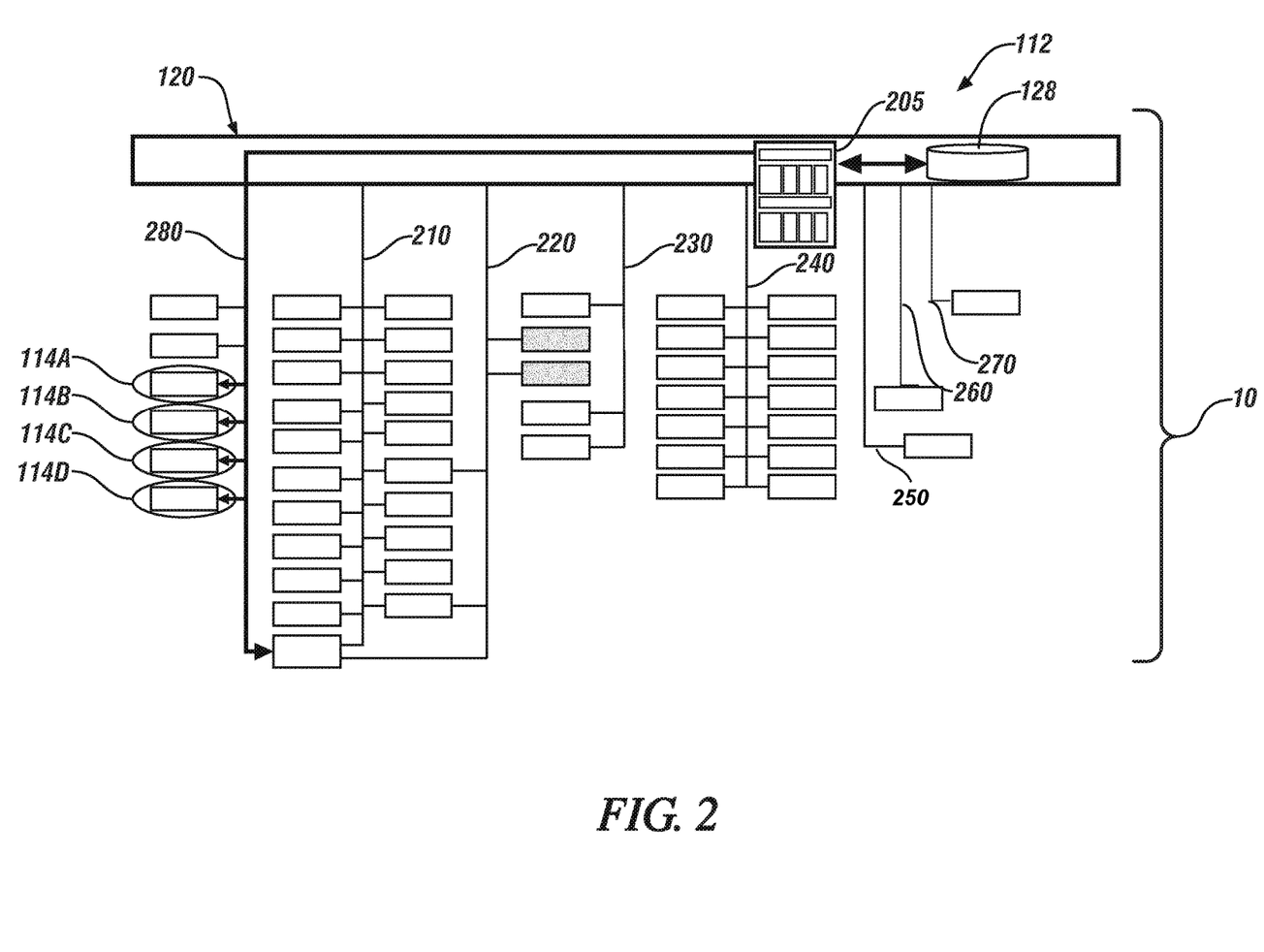
FIG. 2 illustrates example components of the vehicle communication network.

FIG. 2 illustrates example components of the vehicle communication network 112 that facilitate updating the ECUs 114 in an efficient and flexible manner. For example, the telematics device 120 receives an update package 205 for updating one or more of the ECUs 114. Alternatively or in addition, a central gateway module (instead of the telematics device 120) updates the ECUs 114. In one or more other examples, an ECU from the ECUs 114 updates the ECUs 114 (including/excluding itself). Accordingly, although in the examples described herein, the telematics device 120 installs the update package 205 in a parallel manner to update one or more of the ECUs 114, in other examples a different component may be responsible for the installation. In the example of FIG. 2, consider that the ECUs 114A-114D are to be updated using the update package 205. In other examples, fewer, more, and/or different ECUs may be updated. As illustrated, the vehicle communication network 112 includes multiple networks 210-280 to communicate with the ECUs 114 and other components of the mobile vehicle 110. The networks 210-280 may be CAN, Ethernet, or the like that facilitate communication between the ECUs 114 and the telematics device 120, and also among the ECUs 114. The networks 210-280 may each vary in bandwidth capability. For example, the networks 210-280 include a NET1 210 with bandwidth of 500 KBps, NET2 220 with bandwidth of 2 MBps, NET3 230 with bandwidth of 500 KBps, NET4 240 with bandwidth of 125 KBps, NET5 250 with bandwidth of 500 KBps, NET6 260 with bandwidth of 5 MBps, NET7 270 with bandwidth of 5 MBps, and NET8 280 with bandwidth of 2 MBps. In other examples, fewer, more, or different networks may be used.

The update package 205 includes the update sub-packages for each of the ECUs 114A-D that is to be updated. The update sub-packages for each of the ECUs 114A-D may be of a different size than the other. For example, the update sub-package for the ECU 114A may be of a different size than the ECU 114B, and so on. Thus, installing each of the update sub-packages may take different durations.

Further, as described herein, the order of updating the ECUs 114A-D may affect operation of the ECUs 114 and the mobile vehicle 110. The update package 205 may further include sub-package(s) for ECUs coupled via other branches of the vehicle communication network 112, such as NET1 210, NET2 220, and so on. Accordingly, the update sub-packages are to be installed according to a priority order that facilitates the ECUs 114 to continue operating without performance penalties. Further yet, updating an ECU may include multiple parts, for example a part-1 and part-2, where part-2 has to be done after part-1 is complete. In one or more examples, features and functions of one or more ECUs from the ECUs 114 are disabled during the update. For example, part-2 may include, resetting or reconfiguring parameters of an ECU after installing the part-1 of the sub-package. Alternatively or in addition, part-2 may include clearing one or more diagnostic trouble codes (DTC) associated with the ECU.

Based on the one or more restraints posed by the conditions above, the technical solutions described herein determine an installation schedule that facilitates installing the update package 205 for the system including multiple sub-packages for multiple interconnected ECUs 114, such as for the ECUs 114A-D in the least amount of time. In one or more examples, the telematics device 120 determines the installation order of the sub-packages in the update package 205. The telematics device 120 determines the installation order based on parameters such as the installation priorities of the sub-packages, size of the sub package grouped per data transport bus, transport bandwidth limitation of each bus, functional restraint of installation precedence of some sub packages over other sub packages and the like or a combination thereof. In one or more examples, based on the installation order determined, the telematics device 120 installs in parallel the update sub-packages utilizing the transport bandwidth to its fullest capacity whenever the restraints permit it. The telematics device thus determines an installation order for the multiple ECUs 114A-D, (and other ECUs) and installs the sub-packages in the update package 205 in a parallel/serial manner based on the restraints.

Figure 3:
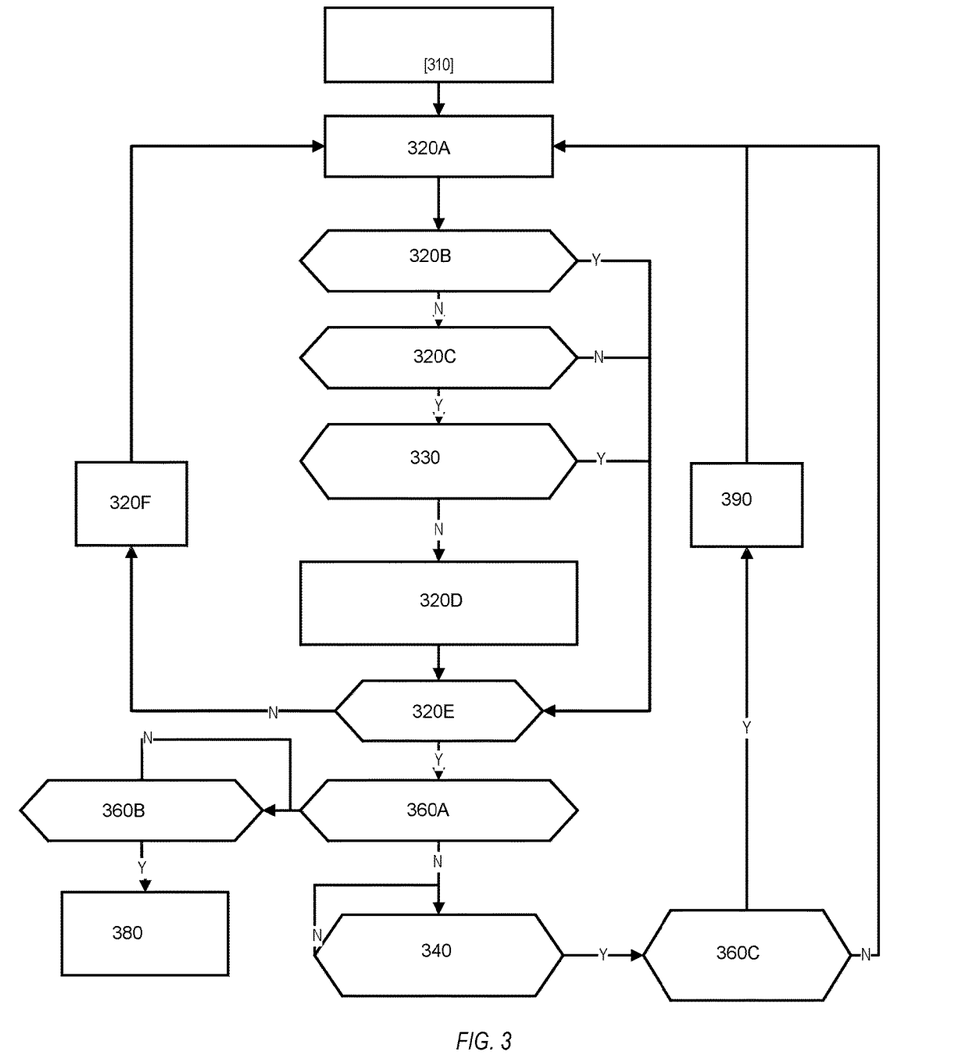
FIG. 3 illustrates a flowchart of an example method for updating multiple ECUs of a vehicle.

FIG. 3 illustrates a flowchart of an example method for updating multiple ECUs of the mobile vehicle 110. In one or more examples, the telematics device 120 implements the method. The telematics device 120 sorts the update sub-packages in the update package 205, as shown at block 310. In one or more examples, the update sub-packages are sorted according to the installation priorities associated with the sub-packages. For example, the installation priorities represent the order in which the ECUs 114A-D are to be updated to ensure compatibility and maintaining performance. The telematics device 120 may further sort the update sub-packages according to the size of the corresponding sub-packages. For example, if two update sub-packages have the same installation priority, the sub-package with the larger size may be scheduled to install earlier than the sub-package with the smaller size. The order of ECUs with the same priority is determined based on the size of the corresponding update sub-package. Thus, the technical solutions facilitating grouping ECUs to be updated in parallel together using the priority level, and determining an order within a group based on the size of the update sub-packages.

The telematics device 120 initiates parallel installation of update sub-packages of a current priority level by identifying which sub-package to start with and which has already started, as shown at blocks 320A-F. The telematics device 120 limits the number of sub-packages installed concurrently per bus, such as the networks 210-280. For example, each network 210-280 may be assigned a predetermined maximum value for a number of sub-packages that may be installed concurrently across the bus. In one or more examples, the predetermined maximum value may be based on the bandwidth capacity of each bus. Accordingly, the telematics device 120 determines the network associated with the ECUs 114A-114D that are to be updated, and further the predetermined maximums associated with the respective networks.

In one or more examples, the telematics device 120 initiates installation of a update sub-package of the largest size of the current priority level on a first network NET1 210 and determines if the maximum value for the NET1 210 is reached, as shown at blocks 320A-F and 330. If the maximum value is not reached, the telematics device 120 initiates another update sub-package using the NET1 210. If the maximum value is reached, the telematics device 120 queues the installation of remaining update sub-packages for the NET1 210. Further, when one network, such as NET1 reaches the maximum value, the telematics device 120 identifies one or more other ECUs at the same priority level on another network, such as NET2 that is not at its corresponding maximum value to install. The device performing installation, such as the telematics device 120 in this case, follows same procedure to schedule other ECU's for installation in other buses with same priority.

The telematics device 120 waits for one or more installations of the update sub-packages that are initiated to complete, as shown at block 340. Once one or more of the installations completes, the telematics device 120 determines if there are additional update sub-packages of the current priority level that have yet to be installed, as shown at block 360A. If update sub-packages were queued, there exist additional update sub-packages, and accordingly, the telematics device 120 generates an event to initiate the update sub-packages that are queued, as shown at blocks 340, and 360C. The telematics device 120 repeats the process to concurrently install a number of the queued update sub-packages based on the predetermined maximum values for each of the networks 210-280. If all the sub-packages are being installed, that is there are no other sub-packages left to be installed after the current batch, the telematics device waits for the current batch of installations, and initiates part-2 of the installation process, as shown at blocks 360A, 360B, and 380. As described herein, the part-2 may include configuring parameters based on the installations.

If all the update sub-packages of the current priority level have been installed, the telematics device 120 determines if additional update sub-packages are left to be installed from the update package 205. If all the update sub-packages have been installed, the telematics device 120 proceeds to initiate part-2 (and/or further parts) of the update sub-packages, if there are any. The part-2 and further steps in the update installation typically complete in negligible amount of time, because such steps include updating parameter values in the ECUs 114.

If all the update sub-packages are not yet installed, the telematics device 120 selects the next priority level, as shown at block 390. The telematics device 120 further repeats the installation of the update sub-packages of the updated current priority level according to the predetermined maximum values of the networks 210-280 as described herein. Thus, the telematics device 120 repeats the above steps until all of the sub-packages of the update package 205 are installed. In one or more examples, the telematics device 120 may execute the method described above for each network 210-280 in parallel for all the sub-packages of the same priority level. Alternatively, if the priority level of each sub package is distinct, then the telematics device 120 installs each sub package serially, satisfying functional constraint in the vehicle. Scenarios of partially parallel and partially serial case can also be satisfied using the technical solutions by adjusting the priority levels of the sub-packages.

Figure 4:
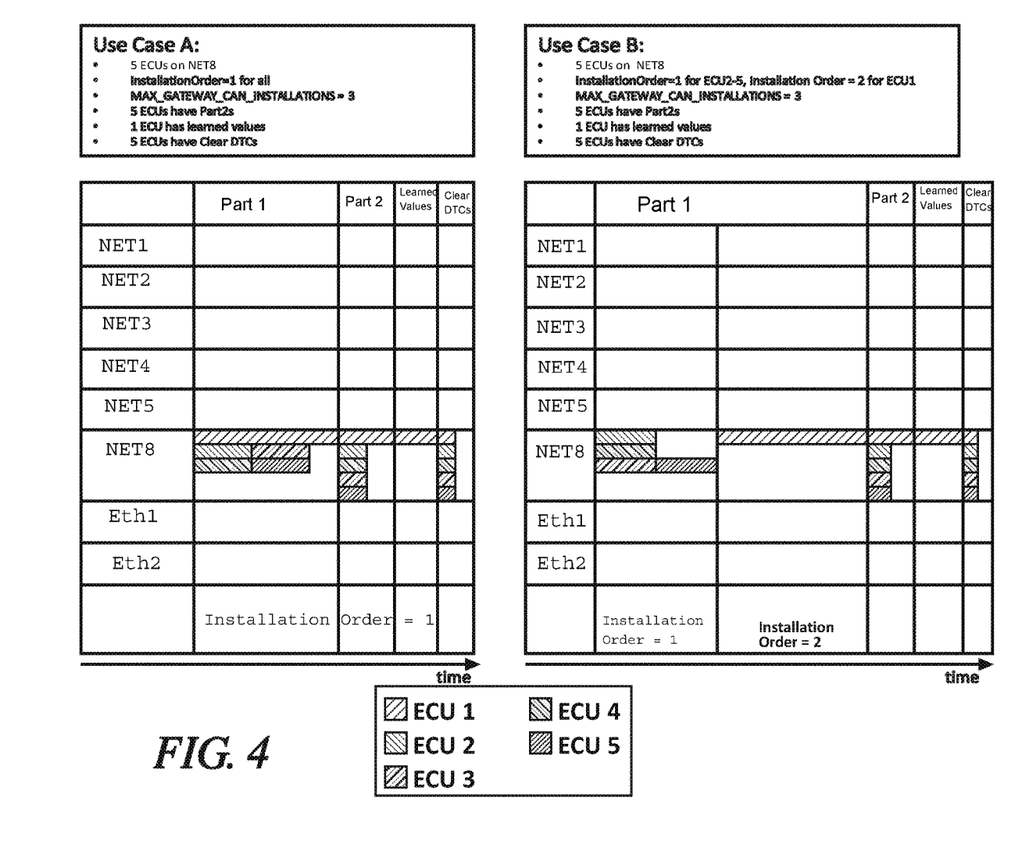
FIG. 4 illustrates example scenarios of installation of an update sub-package for multiple ECUs in a vehicles.

FIG. 4 illustrates example scenarios of installation of update sub-packages using the technical solutions described herein. In both, use-case A and use-case B, that are illustrated, five ECUs—ECU1, ECU2, ECU3, ECU4, and ECU5—are to be updated with corresponding sub-packages. In the example scenarios, all five ECUs are coupled with the telematics device 120 via the same NET8 280, which has a predetermined maximum value of, say 3 concurrent installations. It is understood that in other examples, the predetermined maximum value for concurrent installations may be different. Further, all five ECUs have part-2 installation phases, only ECU1 update sub-package updates learned parameters, and all five ECU updates reset DTC values. The difference between the use-case A and the use-case B is that in the former the installation priority for all the sub-packages is the same (for example, 1) and that in the latter, the installation priority for ECU2-5 is the same (for example, 1) and the ECU1 has a lower priority value (for example, 2). As represented in FIG. 4, the update sub-package for the ECU1 is larger in size compared to the update sub-packages for the ECU2-4 respectively. Table 1 below describes the sizes associated with the update sub-packages.

TABLE 1

| Update Sub-Package | Size |
|---|---|
| ECU1 | 350 MB |
| ECU2 | 250 MB |
| ECU3 | 100 MB |
| ECU4 | 250 MB |
| ECU5 | 80 MB |

Using the method described herein, for use-case A, because the update sub-packages have the same priority level, the size of the update sub-packages determines the installation order. Accordingly, the telematics device 120 initiates the installation of the ECU1 sub-package, which is the largest sub-package. Because the predetermined maximum number of sub-packages that the NET88 280 supports is 3, the telematics device 120 initiates the ECU4 and ECU2 sub-packages (according to their sizes). Accordingly, as represented in FIG. 4, installation of the ECU1, the ECU2, and the ECU4 sub-packages is performed in parallel (or concurrently). The telematics device queues the remaining sub-packages, ECU3 and ECU5. The concurrent installation of ECU1, ECU2, and ECU4, continues until the one of the installation completes; in this case consider that ECU2 completes first. Because the maximum value is 3, and now, with the completion of ECU2, only 2 sub-packages are being installed, the telematics device 120, initiates installation of the next sub-package, ECU3. Accordingly, the telematics device 120 now installs the ECU1, ECU4, and ECU3 sub-packages in parallel, with ECU5 queued. Further, in a similar manner, once ECU4 completes installation, the telematics device 120 initiates installation of the ECU5 sub-package. The installation of the sub-packages completes when all the sub-packages are installed, in this case when ECU1 completes installation. Once the part-1 phase of the installation completes, the telematics device 120 completes the next phases, such as the part-2 phase, updating the learned parameters, and resetting DTCs. The phases after part-1 are completed concurrently for all the sub-packages.

The partial parallelization of the installation reduces the time of installing the sub-packages. For example, if the sub-packages are installed in a serial manner, the installation would clearly require more time than the partially parallelized installation of FIG. 4. The installation of all five sub-packages takes the amount of time it would take to install the ECU1 sub-package alone if the sub-packages were installed in parallel, as can be seen in FIG. 4. It is understood that the parallel installation uses interleaving messages (for example, when using CAN) and sending messages in parallel can slow down the transmission of data to ECUs. Accordingly, the updating time of each individual ECU may increase but not to the extent of the total time of sequentially installing each update sub-package.

Referring to the use-case B, the telematics device 120 completes the installation of the sub-packages with the higher priority, that is the sub-packages for ECU2-5, which have the priority 1. As described earlier, the telematics device 120 initiates the predetermined maximum number of sub-packages for the NET8, which in this case is 3. Accordingly, installation of the first 3 largest sub-packages ECU4, ECU2, and ECU 3 is initiated. The telematics device 120 queues the ECU5 for installation in the next iteration. Once installation of ECU3 completes, the telematics device initiates installation of ECU5. Because ECU1 has a lower priority value, the telematics device 120 first completes installation of all the higher priority sub-packages ECU2-5, before initiating the installation of ECU1. Once installation of ECU1 is completed, the telematics device 120 determines that part-1 phases of all of the sub-packages have been completed and proceeds to the next phases similar to use-case A.

The installation of the sub-packages according to the partial parallelization in use-case B takes more time than that in use-case A, based on the priority levels of the sub-packages.

In examples where the ECUs that are being updated communicate with the telematics device 120 using separate networks 210-280, the telematics device 120 may initiate installation of the update packages via the separate networks in parallel. For example, consider the example scenario of Table 2, in which, unlike the example scenario of Table 1, the ECUs use different networks.

TABLE 2

| ECU | Update Package Size | Install Priority | Bus Membership |
| --- | --- | --- | --- |
| ECU1 | 350 | 1 | NET1 |
| ECU2 | 200 | 1 | NET1 |
| ECU3 | 180 | 1 | NET1 |
| ECU4 | 150 | 1 | NET1 |
| ECU5 | 200 | 1 | NET3 |

In one or more examples, the telematics device 120 initiates concurrent installation of updates for ECU1-3 via NET1, queues the installation of ECU4 in view of the predetermined maximum start value of 3, and initiates the installation of ECU5 via NET3. The installation of ECU4 may be initiated once one of the ECU1-ECU3 updates is completed, for example ECU3.

Figure 5:
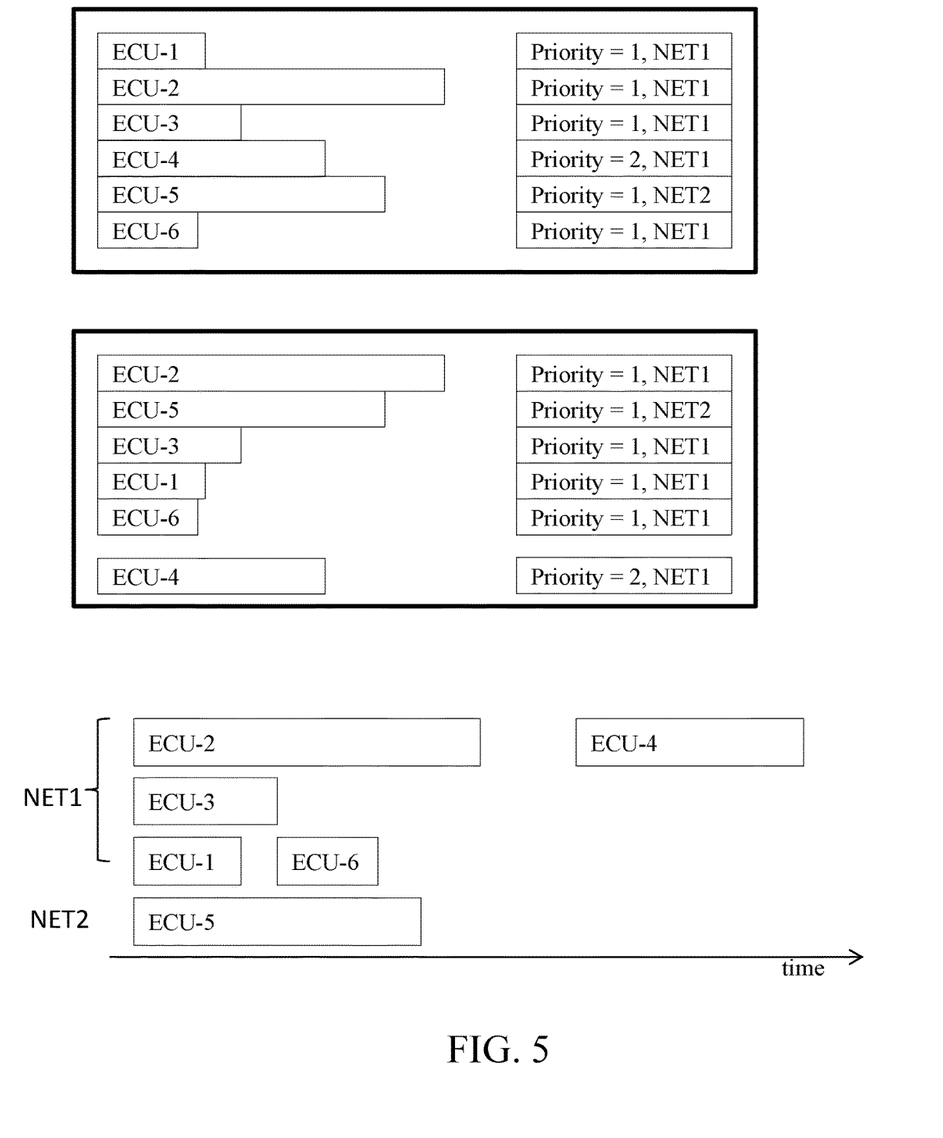
FIG. 5 illustrates a use case for parallel installation of updates for multiple ECUs in a vehicle.

FIG. 5 illustrates another use case for parallel installation of updates for multiple ECUs in a vehicle. As illustrated, the update package 205 includes update sub-packages for six ECUs—ECU1-ECU6. Among these six ECUs, each ECU except ECU-5 uses NET1 as communication bus, and ECU-5 uses NET2 as a communication bus. Further, the update package 205 indicates that each of the sub-packages except for ECU-4 has an installation priority level 1, and the sub-package corresponding to ECU-4 has an installation priority level 2. Further yet, in FIG. 5, the size of each sub-package is depicted by the size of the corresponding block. In one or more examples, the size of the sub-package may be included as metadata in the update package 205. Alternatively or in addition, the telematics device 120, or any other device that is responsible for installing the updates determines the size of the sub-package. The size of the sub-package depicts the amount of memory occupied by the sub-package. In addition, consider that the predetermined maximum value for a number of parallel installations for both, NET1 and NET2, is 3.

Using the method described herein, the telematics device 120, or any other device that is responsible for installing the updates organizes the sub-packages as shown in FIG. 5. The sub-packages of the same installation priority level are sorted according to their sizes. The telematics device 120 initiates parallel installation of the sub-packages of installation priority level 1, based on the communication bus and the respective sizes, as depicted in FIG. 5. The telematics device initiates parallel installation of the sub-packages for ECU-2 and ECU-5 on NET1 and NET2 respectively. Further, because the predetermined maximum value for NET1 is 3, the telematics device 120 additionally initiates installation of updates for ECU-3 and ECU-1 (in that order) using NET1, in parallel with the installation of the updates for ECU-2 and ECU-5. The telematics device queues the installation of ECU-6 (smaller size) and ECU-4 (priority level 2) during this time. Because the installation sub-package for ECU-1 is smallest among those initiated using NET1, updating ECU-1 completes first. Upon completion of the installation for ECU-1, the telematics device 120 initiates installation of the sub-package for ECU-6, which has priority level 1. Once all the sub-packages of installation priority level 1 have been installed in this manner, the telematics device 120 proceeds to install the sub-packages of priority level 2, in this case the sub-package for ECU-4. In addition, as described herein, the telematics device 120 proceeds to part-2 of the update process, which includes configuring and/or resetting parameters for the ECUs after all sub-packages in the update package 205 are installed.

The technical solutions described herein further facilitate accommodating updating an ECU that does not allow any other ECU to be programmed at the same time as that ECU. For example, such an ECU may be assigned a separate installation priority, facilitating the telematics device 120 to install the update for that ECU separately.

Thus, the technical solutions described herein optimize total install time when updating multiple ECUs within a vehicle. The technical solutions do not need manual intervention, and with a default setting (all ECUs having same installation priority) the technical solutions provide the least install time. The technical solutions may be used in vehicles using communication buses, such as CAN, Ethernet, or any other communication bus. For example, the technical solutions described herein may use a CAN bus in which inter frame and inter block separation times in bus communication for the ECUs are within a predetermined variance (for example 5%; or for example, 100 microseconds, 200 microseconds, or any other predetermined variance). Thus, the technical solutions described herein provide a hybrid of parallel and serial installation schedule, with configurability to configure the degree of parallelism and serialization to be used when updating multiple ECUs together in one session. Further, the technical solutions address the restraints in a vehicle, such as limited bandwidth among the ECUs to be updated, which conventional installation scheduling techniques such as first come first serve, shortest job first, priority based, longest job first. The technical solutions described herein, accordingly, improve the updating of multiple ECUs in a vehicle together in a single session.

The present technical solutions may comprise a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e. g., light pulses passing through a fiber-optic cable), or electrical signals transmitted through a wire.

Computer readable program instructions described herein can be downloaded to respective computing/processing devices from a computer readable storage medium or to an external computer or external storage device via a network, such as example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, ... and <N>" or "at least one of <A>, <B>, ... <N>, or combinations thereof" or "<A>, <B>, ... and/or <N>" are to be construed in the broadest sense, superseding any other implied definitions hereinbefore or hereinafter unless expressly asserted to the contrary, to mean one or more elements selected from the group comprising A, B, ... and N. In other words, the phrases mean any combination of one or more of the elements A, B, or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions has been described with reference to exemplary embodiments, it will be understood by those skilled in the art that various changes may be made and equivalents may be substituted for elements thereof without departing from the scope thereof. In addition, many modifications may be made to adapt a particular situation or material to the teachings of the technical solutions without departing from the essential scope thereof. Therefore, it is intended that the technical solutions not be limited to the particular embodiments disclosed, but include all embodiments falling within the scope of the application.

What is claimed is:

1. A computer-implemented method for updating a plurality of electronically controlled units (ECU) in a vehicle with multiple communication buses, the method comprising:
    determining an installation order for updating the plurality of ECUs based on a priority level assigned to each of the ECUs, and a size of each update package for each of the ECUs; and
    updating the ECUs concurrently by installing the respective update packages according to the installation order, wherein updating the ECUs concurrently comprises:
    determining a set of update packages corresponding to ECUs that have the same priority level and the size of each update package;
    selecting a subset from the set of update packages with the same priority level, wherein the subset is selected based on a predetermined maximum start value assigned to a communication bus of the vehicle being used to install the update packages, the predetermined maximum start value indicative of a maximum number of update packages to be installed concurrently via the communication bus, the predetermined maximum start value is based on a bandwidth capacity of the communication bus, the bandwidth capacity indicating a data-transfer speed; and
    initiating installation of the subset of update packages via the communication bus.

2. The computer-implemented method of claim 1, further comprising, receiving the update packages for the ECUs wirelessly.

3. The computer-implemented method of claim 1, wherein the installation order is determined further based on a type of communication bus used by each of the ECUs.

4. The computer-implemented method of claim 1, wherein updating the ECUs concurrently comprises:
    queueing the remaining update packages that are not selected in the subset; and
    initiating installation of the largest update package from the remaining update packages in response to completion of an update package from the selected subset.

5. An apparatus for updating a plurality of electronically controlled units (ECU) in a vehicle, the apparatus comprising:
    a memory;
    a communication interface configured to communicate with the ECUs of the vehicle;
    a processor coupled with the memory and the communication interface, the processor configured to:
    access an installation package that comprises a plurality of update packages corresponding to the plurality of ECUs respectively;
    determine an installation order for updating the plurality of ECUs based on a priority level assigned to each of the ECUs, and a size of each update package; and update the ECUs by installing a subset of the update packages concurrently according to the installation order, wherein updating the ECUs concurrently comprises:

determining a set of update packages corresponding to ECUs that have the same priority level and the size of each update package;

selecting a subset from the set of update packages with the same priority level, wherein the subset is selected based on a predetermined maximum start value assigned to a communication bus of the vehicle being used to install the update packages, the predetermined maximum start value indicative of a maximum number of update packages to be installed concurrently via the communication bus, the predetermined maximum start value is based on a bandwidth capacity of the communication bus, the bandwidth capacity indicating a data-transfer speed; and initiating installation of the subset of update packages via the communication bus.

6. The apparatus of claim 5, wherein the processor is configured to receive the installation package wirelessly.

7. The apparatus of claim 5, wherein the processor is configured to receive the installation package in a wired manner.

8. The apparatus of claim 5, wherein the processor is further configured to receive the priority levels assigned to each of the ECUs, wherein the priority levels are specific to the installation package.

9. The apparatus of claim 5, wherein the installation order is determined further based on a type of communication bus used by each of the ECUs.

10. The apparatus of claim 5, wherein updating the ECUs by installing the subset of the update packages concurrently further comprises:

queueing the remaining update packages that are not selected in the subset; and initiating installation of the largest update package from the remaining update packages in response to completion of an update package from the selected subset.

11. A computer-program product for updating a plurality of electronically controlled units (ECU) in a vehicle, the computer program product comprising a computer readable storage medium, the computer readable storage medium comprising computer executable instructions, wherein the computer readable storage medium comprises instructions to:

access an installation package that comprises a plurality of update packages corresponding to the plurality of ECUs respectively;

determine an installation order for updating the plurality of ECUs based on a priority level assigned to each of the ECUs, and a size of each update package; and update the ECUs by installing a subset of the update packages concurrently according to the installation order, wherein updating the ECUs concurrently comprises:

determining a set of update packages corresponding to ECUs that have the same priority level and the size of each update package;

selecting a subset from the set of update packages with the same priority level, wherein the subset is selected based on a predetermined maximum start value assigned to a communication bus of the vehicle being used to install the update packages, the predetermined maximum start value indicative of a maximum number of update packages to be installed concurrently via the communication bus, the predetermined maximum start value is based on a bandwidth capacity of the communication bus, the bandwidth capacity indicating a data-transfer speed; and initiating installation of the subset of update packages via the communication bus.

12. The computer program product of claim 11, wherein the priority levels assigned to each of the ECUs are specific to the installation package.

13. The computer program product of claim 11, wherein the installation order is determined further based on a type of communication bus used by each of the ECUs.

14. The computer program product of claim 11, wherein updating the ECUs by installing the subset of the update packages concurrently comprises:

queueing the remaining update packages that are not selected in the subset; and initiating installation of the largest update package from the remaining update packages in response to completion of an update package from the selected subset.

* * * * *